United States Patent Office 3,472,874
Patented Oct. 14, 1969

3,472,874
2-SUBSTITUTED 1,4-BENZODIOXANES
Maurice Shapero, Edgware, and Peter Nicholl Green, Pinner, England, assignors to Ward Blenkinsop & Company Limited, Wembley, Middlesex, England, a British company
No Drawing. Continuation-in-part of application Ser. No. 375,925, June 17, 1964. This application July 5, 1968, Ser. No. 742,498
Claims priority, application Great Britain, June 20, 1963, 24,543/63
Int. Cl. C07d 15/18; A61k 27/100
U.S. Cl. 260—340.3        6 Claims

ABSTRACT OF THE DISCLOSURE

The invention provides 2-substituted 1,4-benzodioxanes having the formula

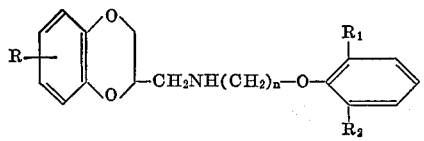

in which R is hydrogen, chlorine or alkyl or alkoxy having 1-6 C., $R^1$ and $R^2$ are alkoxy having 1-6 C and $n$ is 2-6, and acid addition salts thereof. The compounds have sedative and hypnotic activity and are valuable in securing prolonged reduction in blood pressure accompanied by blocking pressor response to adrenaline and by reduced contraction of the nictitating membrane after pre and post ganglionic stimulation of the cervical sympathetic fibres.

---

This application is a continuation-in-part of our copending application, Ser. No. 375,925, filed June 17, 1964, and now abandoned.

This invention relates to the production of pharmacologically valuable 1,4-benzodioxanes.

The present invention provides a 2-substituted 1,4-benzodioxane having the general formula

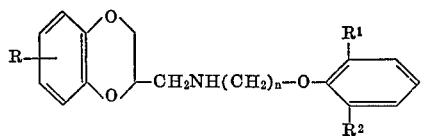

in which R is selected from hydrogen and halogen atoms and alkyl and alkoxy groups having one to six carbon atoms, $R^1$ and $R^2$ are alkoxy groups having from one to six carbon atoms and $n$ is an integer which is greater than one but less than seven, and acid addition salts of such benzodioxanes.

The substituent R may be present in any of the four available positions in the benzene ring of the 1,4-benzodioxane structure, i.e. in the 5-, 6-, 7- or 8- position.

The acid addition salt may be the hydrochloride, sulphate, phosphate, acid maleate, acid succinate or acid tartrate of the said 1,4-benzodioxanes.

According to a feature of the present invention substituted 1,4-benzodioxanes having the above general formula may be prepared by reacting a 2-monosubstituted-methyl 1,4-benzodioxane having the general formula

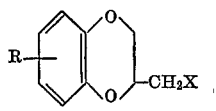

with a dialkoxy phenoxyalkyl compound having the general formula

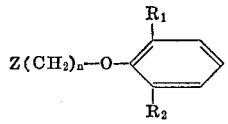

in which formulae R, $R^1$, $R^2$ and $n$ are as above defined one of X and Z is a halogen atom and the other is a primary amino group.

Thus, the reaction may be between a 2-aminomethyl-1,4-benzodioxane and a 2,6-dimethoxyphenoxyalkyl halide or between a 2-halomethyl-1,4-benzodioxane and a primary 2,6-dimethoxyphenoxyalkylamine. Both of these reactions lead to the formation of a hydrohalide of the 2-substituted 1,4-benzodioxane. This hydrohalide may be subsequently decomposed by treating the crude product with an acid acceptor. It is preferred to use an inorganic acid acceptor and to carry out the decomposition in the presence of solvent for the base being liberated. The bases can subsequently be purified by distillation. On neutralisation with an acid the corresponding salt of the base is obtained.

The 2-aminomethyl-1,4-benzodioxanes from which the compounds of the present invention may be obtained include 2 - aminomethyl - 1,4 - benzodioxane, 2 - aminomethyl - 5 - chloro - 1,4 - benzodioxane, 2 - aminomethyl-8 - methyl - 1,4 - benzodioxane and 2 - aminomethyl-8-methoxy-1,4-benzodioxane.

Examples of dialkoxyphenoxyalkyl halides which may be used are beta-2,6-dimethoxyphenoxy)ethyl chloride and bromide, beta-(2,6-diethoxyphenoxy)ethyl chloride and bromide and delta-(2,6-di-n-butoxyphenoxy)-n-butyl chloride and bromide.

The 2-halomethyl-1,4-benzodioxanes from which the compounds of the present invention may also be obtained include 2-chloromethyl-1,4-benzodioxane, 2-bromomethyl-1,4 - benzodioxane, 2 - chloromethyl - 5 - chloro - 1,4-benzodioxane, 2 - chloromethyl - 8 - methyl - 1,4 - benzodioxane and 2-chloromethyl-8-methoxy-1,4-benzodioxane.

Examples of dialkoxyphenoxyalkylamines which may be used are beta-(2,6-dimethoxyphenoxy)-ethylamine and beta-(2,6-diethoxyphenoxy)ethylamine.

The compounds of the present invention are readily obtained as the hydrohalides thereof when the selected reactants are heated together. No solvent is necessary, but one may be used if desired. The cyclic ethers such as dioxane are suitable solvents. The reactants are conveniently employed in substantially stoichimetric proportions. The hydrohalides may be decomposed and the bases purified as indicated above.

The compounds of the present invention have sedative and hypnotic activity. Thus they have been found to protect mice, rats and cats against lethal effects of adrenaline when administered by the oral route. The compounds have been found to be equally effective, whether administered by the intravenous, subcutaneous or oral routes, in blocking the hypertensive response induced by stimulation of the splanchnic nerve or by the injection of adrenaline or noradrenaline. Of particular significance is the effect upon the blood pressure of anaesthetised rats and cats. Thus the compound described in Example 1 when administered intravenously to anaesthetised rats in the form of the hydrochloride in an amount of 0.1 mg. per kilogram bodyweight produced a 40% fall in blood pressure which persisted for 120 minutes. Effects of such prolonged duration are exceptional in our experience. Effective doses in rats have been found to be 0.1 to 10.0 milligrams per kilogram bodyweight depending upon the route employed.

When administered to conscious rabbits subcutaneously, doses of 2.5 to 10 milligrams per kilogram bodyweight were effective in preventing the rise in blood pressure which otherwise follows the intravenous injection of noradrenaline.

The is a marked and unexpected difference in the properties of the compounds when two alkoxy groups, especially methoxy and/or ethoxy groups, are respectively present in the 2- and 6-positions in the phenoxy group as compared with similar compounds which have but a single alkoxy group present in the phenoxy group, even when such alkoxy group is present in the 2-position in the phenoxy group. This has been shown by experiments upon mice and anaesthetised cats using respectively the compound in which R and $R^2$ are hydrogen atoms whilst $R^1$ is a methoxy group present in the 2-position (i.e. using 2 - [2' - (2" - methoxyphenoxy)ethylaminomethyl]-1,4-benzodioxane) and the compound in which R is a hydrogen atom whilst $R^1$ and $R^2$ are methoxy groups respectively present in the 2- and 6-positions (i.e. using 2-[2'-(2",6" - dimethoxyphenoxy)ethylaminomethyl] - 1,4-benzodioxane). To protect mice against the lethal effects of adrenaline the effective dose $ED_{50}$ when administered orally is 3.6±0.6 mg. per kilogram body weight for the monomethoxy compound whilst that for the dimethoxy compound is 0.22±0.03 mg. per kilogram body weight—that is to say only about one-fifteenth the amount of the latter compound is required to give the same degree of protection.

When administered to anaesthetised cats a dosage of 5 mg. per kilogram body weight of the monomethoxy compound administered intravenously reduced the blood pressure of the animals by 15%. The blood pressure returned to normal within 25 minutes. This dosage of the monomethoxy compound blocked the pressor response to adrenaline but failed to inhibit contraction of the nictitating membrane following stimulation of the pre and post ganglionic cervical sympathetic fibres. When the dimethoxy compound was administered intravenously to anaesthetised cats a dosage of 0.5 mg. per kilogram body weight administered intravenously reduced the blood pressure of the animals by 31% and return to normal only occurred after 90 minutes. This dosage of the dimethoxy compound not only blocked the pressor response to adrenaline but also reduced contraction of the nictitating membrane after pre and post ganglionic stimulation of the cervical sympathetic fibres by 72%. It will be seen that the dimethoxy compound reduces blood pressure to a much greater extent than does the monomethoxy compound when administered in a dosage which is only 10% by weight of that used with the monomethoxy compound and that the reduction is much more prolonged. In addition reduction in the contraction of the nictitating membrane after stimulation is only observed with the dimethoxy compound. Similar behaviour has been observed with the corresponding diethoxy compounds.

When administered orally the compounds reduce hypertension in hypertensive rats.

The following examples illustrate the production of the compounds of the invention.

EXAMPLE 1

2-[2'-(2",6"-dimethoxyphenoxy)ethylaminomethyl]-1,4-benzodioxane 2-aminomethyl-1,4-benzodioxane (17 g.) and 2,6-dimethoxyphenoxyethyl chloride (10.8 g.) were heated under reflux at 160° C. for 2 hours prior to mixing with chloroform (30 mls.) and potassium carbonate (7 g.) dissolved in water (20 mls.). After removal of the chloroform layer and two extractions of the aqueous layer with chloroform (10 mls. each), the combined chloroform extracts were dehydrated over anhydrous sodium sulphate. Filtration, followed by distillation gave the product as a yellow, very viscous oil (10 g.) boiling at 234–238° C./1 mm.

The base was readily converted to a white hydrochloride having a melting point of 155–7° C. by the addition of alcoholic hydrogen chloride to an ether solution of the base and isolation of the salt which separated.

EXAMPLE 2

2-[2'-(2",6"-dimethoxyphenoxy)ethylaminomethyl]-8-methyl-1,4-benzodioxane 2-aminomethyl-8-methyl - 1,4 - benzodioxane (14.3 g.) and 2,6-dimethoxyphenoxyethyl chloride (8.5 g.) were heated under reflux at 150° C. for 90 minutes prior to working up as described in Example 1. The product was obtained as a yellow, viscous oil (8.7 g.) boiling at 228–230° C./0.5 mm.

The base was readily converted into a white hydrochloride by the method described in Example 1 and had melting point 165–168° C.

*Analysis.*—Calculated for $C_{20}H_{26}NO_5Cl$: C, 60.67%; H, 6.62%; Cl, 8.96%. Found: C, 60.40%; H, 6.58%; Cl, 9.21%.

EXAMPLE 3

2-[2'-(2",6"-dimethoxyphenoxy)ethylaminomethyl]-8-methoxy-1,4-benzodioxane 2-chloromethyl-8-methoxy-1,4-benzodioxane (10.7 g.) and 2,6-dimethoxyphenoxyethylamine (21.3 g.) were heated at 150° C. for two hours prior to working up as described in Example 1. The product was obtained as a very viscous yellow oil (9.8 g.) boiling at 234–240° C./0.3 mm.

The base was readily converted into a hydrochloride by the method described in Example 1.

EXAMPLE 4

2-[2'-(2",6"-dimethoxyphenoxy)ethylaminomethyl]-7-chloro-1,4-benzodioxane 2-chloromethyl-7-chloro - 1,4 - benzodioxane (14.3 g.) and 2,6-dimethoxyphenoxyethylamine (27.8 g.) were heated under reflux at 150° C. for two hours prior to working up as described in Example 1. The product was obtained as a yellow, viscous oil (15.5 g.) boiling at 222–228° C./0.2 mm.

The base was readily converted into a hydrochloride by the method described in Example 1.

The benzodioxanes of the present invention may be administered in the form of tablets, capsules or suppositories or by the intravenous route.

Tablets may be formulated with any of the customary excipients such as maize starch or lactose, with a binder such as a starch mucilage or Dextrin, methyl, cellulose or sodium alginate and with a lubricant such as talc, stearic acid or magnesium stearate. A typical formulation is as follows:

| | Mgm. |
|---|---|
| Benzodiaxane derivative | 25 |
| Lactose | 150 |
| Maize starch B.P. | 69 |
| Talc B.P.C. | 2.5 |
| Stearic acid | 1.0 |
| Dextrin | 2.5 |

Capsules may also be formulated each containing a predetermined quantity of benzodioxane derivative together with an excipient, a binder and a lubricant within a water-soluble casing. The excipient, binder and lubricant may be any of those which may be used in the above described tablet formulations. Each capsule may contain 25 mgm. of benzodioxane derivative and the casing may be made of gelatine.

For intravenous injection the benzodioxane derivative in the form of the hydrochloride or other salt with a pharmacologically acceptable acid may be dissolved in water to produce, for example, a 1% by weight solution and predetermined quantities of the solution then sealed into ampoules or vials which are subsequently sterilised by heating in an autoclave following the method described in the British Pharmacopoeia 1958, page 7326 or by subjecting to the action of gamma radiation.

We claim:
1. A compound selected from the group of a 2-substituted 1,4-benzodioxane having the formula

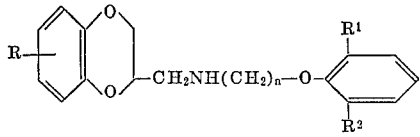

in which R is selected from the group consisting of hydrogen, chlorine and alkyl and alkoxy groups having one to six carbon atoms, $R^1$ and $R^2$ are alkoxy groups having one to six carbon atoms and $n$ is an integer which is greater than one but les than seven, and acid addition salts thereof.

2. A compound as claimed in claim 1 in which $n$ is 2.
3. A compound selected from the group of 2-sub stituted 1,4-benzodioxanes as claimed in claim 1 in which R is hydrogen, $R^1$ is methoxy, $R^2$ is methoxy and $n$ is 2, and the hydrochloride thereof.
4. A compound selected from the group of 2-substituted 1,4-benzodioxanes as claimed in claim 1 in which R is methyl present in the 8-position, $R^1$ is methoxy, $R^2$ is methoxy and $n$ is 2, and the hydrochloride thereof.
5. A compound selected from the group of 2-substituted 1,4-benzodioxanes as claimed in claim 1 in which R is chlorine present in the 7-position, $R^1$ is methoxy, $R^2$ is methoxy and $n$ is 2, and the hydrochloride thereof.
6. A compound selected from the group of 2-substituted 1,4-benzodioxanes as claimed in claim 1 in which R is methoxy present in the 8-position, $R^1$ is methoxy, $R^2$ is methoxy and $n$ is 2, and the hydrochloride thereof.

References Cited

Augstein et al.: Journ. Med. Chem., vol. 8, No. 3 (1965) England, pp. 356–67.

Fenton, et al.: Nature, vol. 206 (4985), 1965, England, pp. 725.

ALEX MAZEL, Primary Examiner

JAMES H. TURNIPSEED, Assistant Examiner

U.S. Cl. X.R.

424—278